United States Patent [19]

Gaffney

[11] 4,184,904
[45] Jan. 22, 1980

[54] METHOD FOR PRODUCING SHEET MATERIAL

[75] Inventor: William Gaffney, New York, N.Y.

[73] Assignee: Charlotte Mintz, New York, N.Y.

[21] Appl. No.: 849,597

[22] Filed: Nov. 8, 1977

[51] Int. Cl.² ............................................. A63B 41/00
[52] U.S. Cl. ................................. 156/145; 156/244.14; 156/244.15; 156/244.25; 156/285; 156/290; 156/292; 156/497; 156/500; 156/553
[58] Field of Search ........... 156/145, 146, 147, 244.13, 156/244.14, 244.15, 244.25, 285, 287, 290, 292, 500, 553, 497; 53/7, 9, 12, 26, 28, 122; 264/88, 94, 95, 99, 209; 425/133.1, 237, 388, 395, 405, 408, 504, 519

[56] References Cited

U.S. PATENT DOCUMENTS

| | | | |
|---|---|---|---|
| 3,011,930 | 12/1961 | Dworak | 156/145 |
| 3,142,599 | 7/1964 | Chavannes | 156/292 |
| 3,655,486 | 4/1972 | Hagino et al. | 156/285 |
| 3,684,614 | 8/1972 | Lemelson | 156/285 |
| 3,703,430 | 11/1972 | Rich | 156/553 |
| 3,751,537 | 8/1973 | Scotto et al. | 264/209 |
| 3,954,368 | 5/1976 | Kawakami | 425/326 R |

FOREIGN PATENT DOCUMENTS

2195188  1/1974  France ................ 156/244.14

*Primary Examiner*—Caleb Weston
*Attorney, Agent, or Firm*—Kirschstein, Kirschstein, Ottinger & Cobrin

[57] ABSTRACT

A method for making a continuous bilaminar planar sheet material utilized for packaging of goods and having raised pockets containing a gas. The sheet material is made by extruding a molten plastic through an extruder having a cylindrical nozzle with an annular circular slot opening, so that a tubular hollow element is formed. A plurality of heating elements are arranged around the circumference of the annular circular slot to maintain the temperature of the extruded material at different temperatures around the circumference of the annular slot.

14 Claims, 16 Drawing Figures

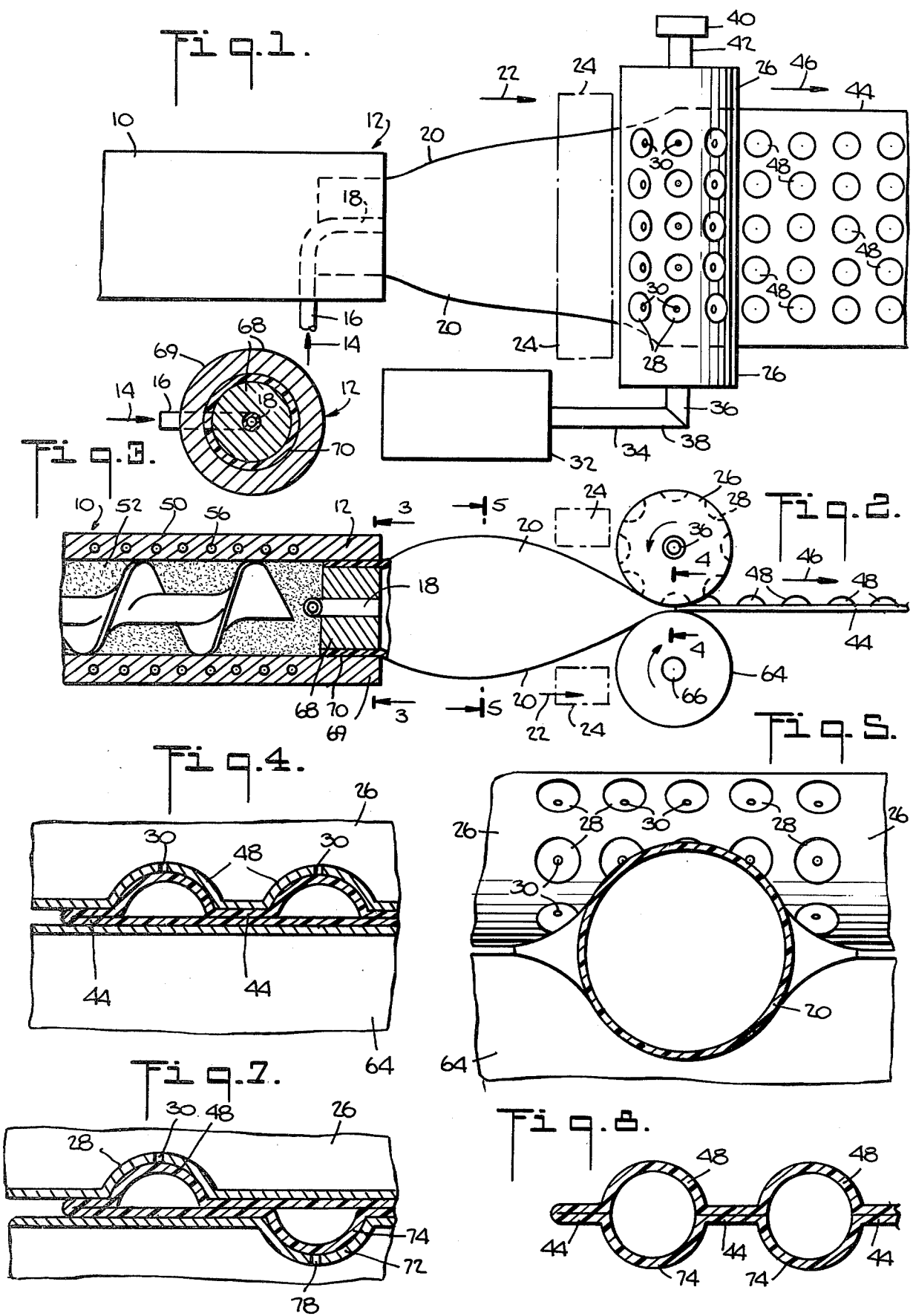

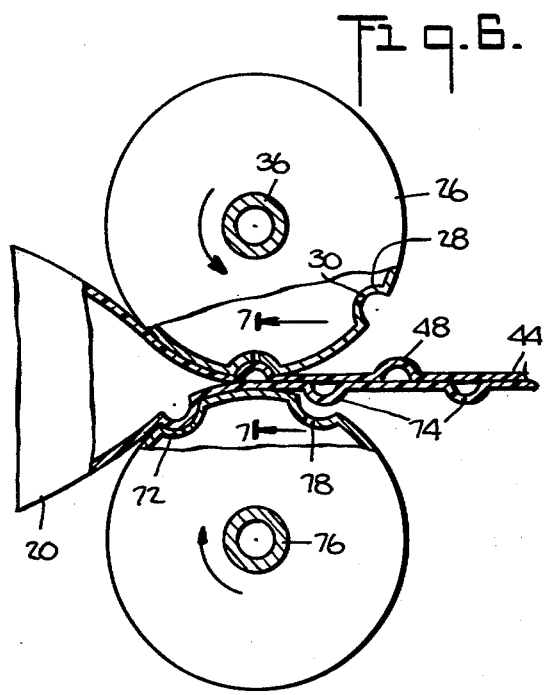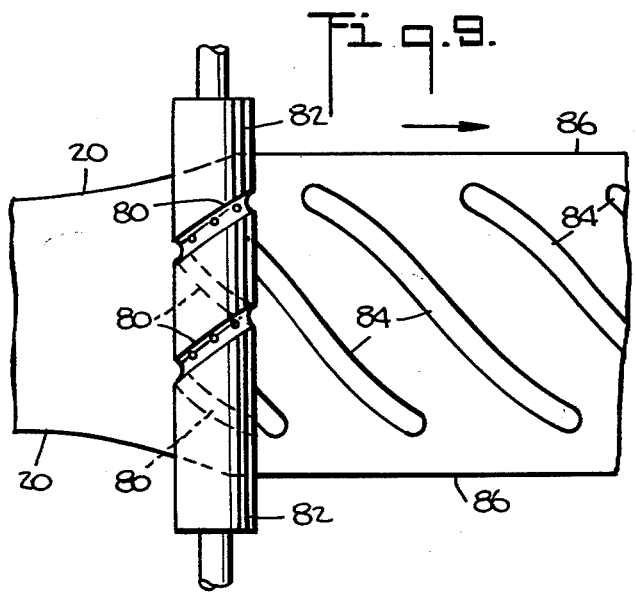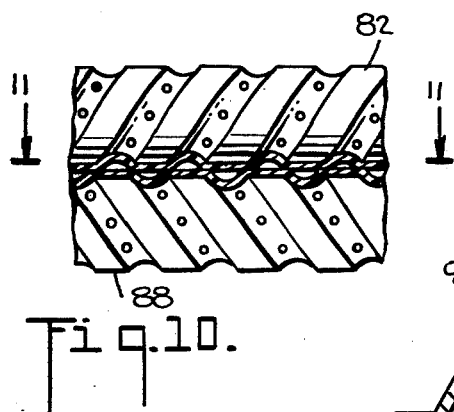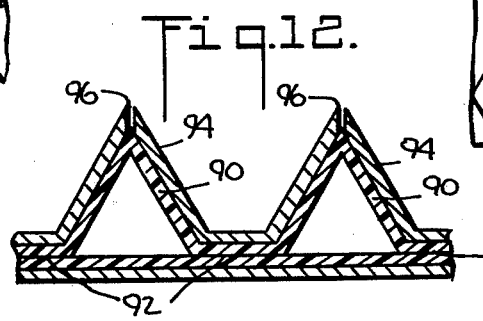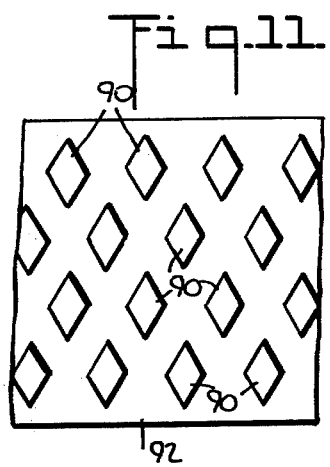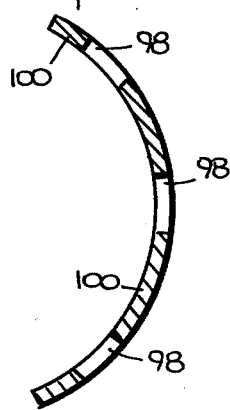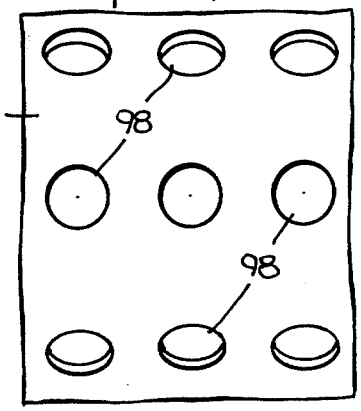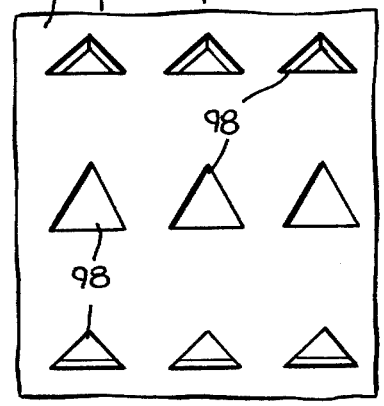

METHOD FOR PRODUCING SHEET MATERIAL

BACKGROUND OF THE INVENTION

1. Field of the Invention

The invention relates to the manufacture of sheet material used for packaging. More particularly it relates to the manufacture of bilaminar sheet material having raised pockets containing a gas, said pockets extending from either or both surfaces of the sheet.

2. Description of the Prior Art

In the past a variety of relatively complex apparatus, devices and methods have been suggested for producing sheet material of uniform thickness having closed pockets, blisters or bubbles. These prior art methods and apparatus are generally characterized by being intricate and complicated, with a resultant excessive cost for producing the finished product. A particular problem encountered in the many of these processes has been the lack of uniformity of thickness of the sheet material. This is due to the fact that when a tubular member is extruded through an annular circular slot and subsequently passed through the nip of two juxtaposed parallel cylindrical rollers the center portion of the flattened bilaminar sheet material, thus formed, is thinner than the edge portions. This thinning out of the central portion is due to internal stresses exerted upon the molten tubular member as it is drawn from a generally tube like member to a flattened member by the nip of the rollers. As would be evident the thinner center portion substantially weakens the sheet, as well as any raised pockets formed within said portion; the end result being a serious detraction from the cushioning qualities of the product.

The present invention has overcome many of the disadvantages of the prior art in that it provides for an apparatus and method for producing a bilaminar sheet material of substantially uniform thickness, having raised pockets thereon, which is relatively simple and inexpensive to operate.

SUMMARY OF THE INVENTION

In the present invention, a method and apparatus is provided for the production of bilaminar sheet material, i.e. a continuous bilaminar planar sheet element or web, having closed pockets containing a gas extending from either or both surfaces of the sheet material. Within the context of the present invention, the term "closed pockets" will be understood to encompass and include bubbles, blisters or the like as well as pockets, per se. The invention features the provision of a slotted extrusion means, such as a cylindrical nozzle, having an annular circular slot opening and a plurality of heating elements, arranged around the circumference of the cylindrical nozzle, which are adapted to maintain the temperature of the extruded material at various points around the circumference of the annular slot at different temperatures as the material issues from the slot.

Liquids such as molten plastic, resin, synthetic rubber, or the like, are extruded through the slot in the extrusion element, so that the liquid solidifies and a generally tubular hollow film element having wall thicknesses of unequal dimensions is formed. Concomitantly, a slightly pressurized gas is discharged into the slotted extrusion means, typically centrally or axially in the direction of extrusion, so that the gas fills and expands the tubular hollow element.

The next step in the procedure is to pass the tubular hollow element containing the gas, the element still being warm enough to be deformable and pressure weldable, between two juxtaposed parallel cylindrical rollers which rotate in opposite directions, i.e. one roller rotates in a clockwise direction and the other roller rotates in a counterclockwise direction, so that the tubular hollow element is drawn into the nip between the rollers. The tubular hollow element is thereby collapsed and flattened into a continuous bilaminar planar sheet element or web having a uniform thickness over the entire area of the sheet. The opposed surfaces of the flattened tube are autogenously welded to each other under heat and pressure when the hollow tube is collapsed. At least one of the rollers is provided with a plurality of spaced apart recesses on its outer surface; these recesses may be of any suitable configuration such as spiral grooves, discrete cavities, apertures in a hollow roller, etc. The result is that when the tubular element is collapsed by the rollers, the gas within the tubular element is entrapped in a plurality of spaced apart pockets formed in situ on the surface of the bilaminar planar sheet element or web. The resultant sheet material is thus formed with a plurality of gas-filled pockets protruding from either or both surfaces.

The method and apparatus of the present invention provides several salient advantages. A relatively simple technique and apparatus is provided to accomplish the production of the desired sheet material. Thus, the capital cost of a facility for producing the sheet material is lowered. Operating cost and unit cost of production also is lowered, compared to facilities of the prior art. The gas being discharged into the tubular hollow element may be a gas lighter, i.e. less dense, than air. In this case, the sheet material is highly advantageous for usage in packaging where weight of the package is an important cost factor, e.g. in air freighting of goods or air mail of packages.

Another advantage of the present invention is that the pockets may be formed in any desired shape, size, and pattern, depending on market preferences, by varying the disposition and configuration of the recesses on the rollers employed, i.e. rollers of varying dimension with varying sizes, shapes and patterns of recessed may be alternatively employed in a given facility to yield any desired type of sheet material with raised pockets suitable for market preference.

Accordingly it is an object of the present invention to provide an improved method and apparatus for the production of bilaminar sheet material of substantially uniform thickness characterized by the presence of closed pockets, blisters or bubbles.

Another object is to produce bilaminar sheet material for packaging in an improved manner.

A further object is to provide a method and apparatus for producing bilaminar sheet material which lightens the shipping weight of goods, especially for air freight.

Still another object is to provide a method and apparatus for producing bilaminar sheet material having closed surface pockets, blisters or bubbles of any of a variety of configurations suitable for different applications.

Still a further object is to provide a relatively simple, economical and eminently operable method and apparatus for producing bilaminar sheet material having closed surface pockets, blisters or bubbles.

Another object of the present invention is to produce bilaminar sheet material having any desired gas emplaced in situ in closed surface pockets, blisters or bubbles.

An additional object is to provide for an improved extruding apparatus and method which extrudes a tubular hollow film element having wall portions of varying thicknesses such that when collapsed a bilaminar sheet of uniform thickness is obtained.

Still an additional object is to lower the cost of producing bilaminar sheet material having closed surface pockets, blisters or bubbles.

These and other objects and advantages of the present invention will become evident from the description which follows.

BRIEF DESCRIPTION OF THE DRAWINGS

In the accompanying drawings in which are shown some of the various possible embodiments of the invention:

FIG. 1 is a plan view of one embodiment of the invention;

FIG. 2 is an elevation view of the FIG. 1 embodiment of the invention;

FIG. 3 is a sectional elevation view of the extrusion portion of FIG. 2 taken substantially along the line 3—3 of FIG. 2;

FIG. 4 is a sectional elevation view of a portion of the apparatus of FIG. 2, taken at the nip of the rollers and taken substantially along the line 4—4 of FIG. 2;

FIG. 5 is another sectional elevation view of a portion of the apparatus of FIG. 2, taken substantially along the line 5—5 of FIG. 2;

FIG. 6 is an elevation view of the rollers portion of an alternative embodiment of the invention;

FIG. 7 is a sectional elevation view of a portion of the apparatus of FIG. 6, taken at the nip of the rollers and taken substantially along the line 7—7 of FIG. 5;

FIG. 8 shows an alternative configuration of bilaminar sheet material which may be produced by a slight alteration of the relative positioning of the rollers of FIG. 6, i.e. with the cavities in registered alignment at the nip of the rollers;

FIG. 9 shows an alternative roller configuration, i.e. a spiral cavity or groove on a roller;

FIG. 10 illustrates a preferred embodiment of the roller configuration of FIG. 8;

FIG. 11 taken substantially along the line 11—11 of FIG. 10, shows a pattern of pockets produced by the roller configuration of FIG. 10;

FIG. 12 is a detail showing the formation of pockets of a pyramidal configuration;

FIG. 13 is a sectional elevation view of a hollow roller provided with apertaures;

FIG. 14 shows the roller of FIG. 13 with circular apertures;

FIG. 15 shows the roller of FIG. 13 with triangular apertures, and

DETAILED DESCRIPTION OF THE PREFERRED EMBODIMENTS

Figure 16:
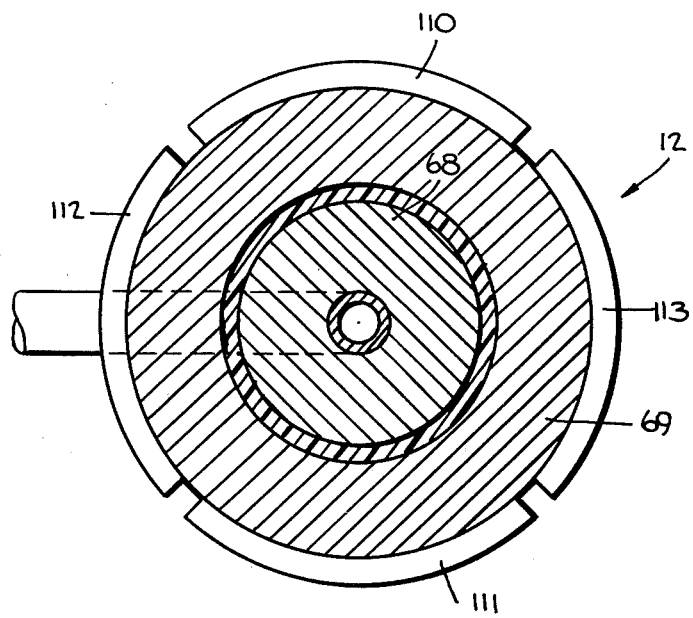
FIG. 16 is a sectional elevation view of the extrusion portion of FIG. 2 taken substantially along lines 3—3 of FIG. 2 depicting the heater elements of the preferred embodiment.

Referring now to FIG. 1, a facility 10 provides a hot molten thermoplastic resin to an extrusion means 12, which as will appear below is a horizontally oriented annular nozzle. A gas steam 14, at a slightly positive pressure of a few inches of water, passes via pipe 16 to a central discharge outlet 18 aligned with the central axis of the extruder 12. A resultant hot tubular hollow pellicular element 20 is extruded from the nozzle 12, and element 20 moves or travels away from element 12 to the right, as indicated by the arrow 22. The tubular hollow element 20 is heated by radiant element 24, shown in phantom outline, immediately prior to traveling into the nip between a roller 26 and another lower roller, below the roller 26 and not shown in FIG. 1.

Element 24 may be any suitable heating means, e.g. infra-red heating or other heating employing an electric resistor heating element, or provision of a plurality of warm air streams spaced from and about the periphery of the tubular hollow element, or suitable steam jackets, etc., before passing the tubular hollow element between the rollers, so that the tubular hollow element is softened and heated to a temperature at which pressure welding will occur.

The roller 26 is a rotating cylindrical element characterized by the provision of a plurality of regularly arranged and mutually spaced depressions 28 in its outer surface. In this embodiment of the invention, the depressions 28 are hemispherical cavities, each having a central passage or hole 30 which extends inwardly a short distance to the hollow interior of the roller 26. A low pressure is created in the interior of the roller 26 by a vacuum generating means 32 which is typically a vacuum pump, aspirator or the like, so that a vacuum effect extends to roller 26 via connected pipes 34 and 36. Since pipe 34 is stationary and pipe 36 rotates coaxially with the roller 26, joint 38 between the pipes 34 and 36 will be a suitable slip joint or gasketed joint which permits movement between the respective members 34 and 36, as is well known to those skilled in the art. The vacuum effect created by member 32 is thus transmitted to those of the holes 30 immediately at the nip of the rollers by suitable valving such as weighted flap valves responsive to gravity within the body of the roller 26, i.e. valving or other suitable means not shown will be provided so that the vacuum effect will not be dissipated or diminished by being exerted through those of the passages 30 which happen to be open to the atmosphere at any particular time as roller 26 rotates about its central horizontal axis. Thus, those of the passages 30 actually shown in FIG. 1 are closed against air entry, since they are shown in a disposition on the upper surface of the roller and away from the nip between the rollers. Suitable means such as a motor 40, a driveshaft 42, and gearing is furnished to rotate the roller 26.

A continuous bilaminar planar sheet element or web is formed as element 20 moves through the nip between the rollers, and this sheet element is shown in plan view as a sheet 44 moving to the right as indicated by the arrow 46 and away from the rollers. The facing abutting surfaces of the flattened tubular element are warm enough to be autogenously welded to each other as they are squeezed together at the nip. The sheet element 44 is characterized by the presence of a plurality of regularly spaced apart hemispherical pockets 48 on its upper surface, which pockets 48 contain the gas 14. The sheet element 44 is now usually passed to a suitable take-up roller, not shown, on which the sheet 44 is wound for shipment to market. Alternatively sheet 44 may be periodically cut into suitable lengths by a flying shears or the like, which lengths of sheet material are stacked up for boxing and shipment to market.

Typical materials suitable for usage in the present invention are thermoplastic materials, including polyethylene, polypropylene, polystyrene, polyurethane, polyvinyl chloride, etc. The gas which is discharged into the tubular hollow element, typically centrally from the slotted extrusion means, may be air, or a gas lighter than air such as hydrogen, helium, neon or nitrogen.

As far as the geometric configurations of the elements are concerned, the tubular hollow element and the bilaminar planar sheet element preferably will be horizontally oriented during extrusion and flattening, i.e. the direction of travel of the material will in most instances be generally horizontal, although it will be understood that vertically downwards travel or inclined travel of the material also is feasible. Similar considerations apply with regard to the rollers, i.e. the rollers usually will be horizontal with parallel horizontal axis, so that the bilaminar sheet material as formed will be in a horizontal plane. The axis of the rollers usually will be generally perpendicular to the central axis of the tubular hollow element, i.e. in preferred embodiment the horizontal axis of the rollers will be perpendicular to a vertical plane through the horixontal central axis of the tubular hollow element.

In another embodiment of the invention, mutually spaced recesses will be provided on both of the rollers, so that pockets are formed on both sides of the sheet material. In this case, the spaced recesses on the rollers may be so positioned that the recesses on one roller mate with the recesses on the other roller as the bilaminar sheet material is being formed by the rollers, so that a single pocket is formed by mating recesses, i.e. recesses are directly opposed in registered alignment when the rollers rotate to the point that these recesses are in closest contiguous relationship, whereby the single pocket formed by mating recesses extends outwards on both sides of the continuous bilaminar planar sheet element.

As mentioned above, the plurality of recesses may be of any suitable configuration, e.g. continuous spiral grooves, discrete cavities, apertures in a hollow roller, etc. In instances when the spaced recesses are a plurality of continuous spiral grooves, in a preferred embodiment, grooves are provided on both of the rollers, with the grooves on one roller being of right-hand pitch and the grooves on the other roller being of left-hand pitch, so that a criss-cross pattern of pockets is formed, typically with a single diamond-shaped pocket extending outwards on both sides of the sheet element where the spiral grooves intersect, and alternate pockets elsewhere on either side of the sheet element.

When the recesses are discrete cavities, i.e. shallow depressions in the surface of the rollers, the cavities, and resultant pockets formed therefrom, may be of any suitable configuration, e.g. hemispherical, hemioval, pyramidal, etc. In addition, when cavities are provided, it is feasible, and in some instances will be preferable, to provide a hollow central axial section in one or both rollers, with one or more passages extending from the hollow interior of the roller to each cavity, with means such as a vacuum pump being provided to create a vacuum within the hollow roller, so that the vacuum draws sheet material into each cavity as the material passes into the nip of the rollers, thereby insuring the formation of uniform, fully shaped pockets.

When the recesses are apertures, i.e. holes in a hollow roller, so that the hollow roller is foraminous, the apertures may be of any suitable configuration, e.g. circular or regular polygons of suitable shape such as triangular, rectangular, diamond-shaped, etc.

FIG. 2 schematically indicates a standard screw extruder 12 with a heated barrel 50 for melting a thermoplastic material 52 prior to forcing it out of an annular nozzle by means of a screw feeder 54. A heating element 56 of extruder 12 is provided to heat the particulate solid thermoplastic material 52 for a brief time interval immediately prior to egress from unit 12, so that the solid material 52 is melted without further polymerization occurring.

A lower roller 64 is shown below the roller 26 in FIG. 2. The roller 64 is mounted on and driven by an axial driveshaft 66 geared for counter rotation in a one-to-one ratio to the driveshaft 42. It will be understood that by the provision of suitable shafting and gearing, both rollers 26 and 64 may be concomitantly driven and rotated by the same motor 40. As is apparent from FIG. 2, the roller 64 has a smooth unbroken surface so that only the upper surface of the sheet 44 is provided with pockets 48.

FIG. 3 shows details of the extruder 12, including an inner core 68 spaced from and within the outer sleeve 69, so that an annular circular slot 70 is provided for extrusion of the molten thermoplastic.

FIG. 4 is a detail showing the formation of the pockets 48 at the nip between the rollers 26 and 64. As shown, the areas other than where the pockets exist, are formed and consist of two layers of mutually fused flat sheet material. The basically hollow interior of the upper roller 26, within which a vacuum is provided to extend through openings 30 for the reasons mentioned above, is evident from FIG. 4.

FIG. 5 shows the collapsing of the tubular hollow element 20 as it enters the nip between the rollers 26 and 64.

FIG. 6 illustrates an alternative embodiment of the invention in which a plurality of cavities 72 are provided on the lower roller 64 in addition to the cavities 28 on the upper roller 26 and out of registry therewith, so that pockets 74 are formed on the lower surface of sheet 44 in alternate sequence to the pockets 48 on the upper surface of sheet 44. A vacuum is drawn through central lower pipe 76 which extends into hollow roller 64, so that a vacuum effect extends via openings 78 into cavities 72 for the purposes set forth supra.

FIG. 7 is a detail showing the formation of alternate upper and lower pockets 48 and 74 at the nip of the rollers, while FIG. 8 shows an alternative configuration in which the cavities mate or match and the upper and lower pockets are coextensive and serve to form single pockets which extend outwards on both sides of the sheet 44.

FIG. 9 illustrates an alternative roller configuration, namely one in which the recesses are cavities in the form of spiral grooves 80 on the surface of a roller 82, so that elongated linear pockets 84 are formed on the surface of the sheet material 86.

FIG. 10 shows an arrangement similar to FIG. 9 except that spiral cavities or grooves are provided on both an upper roller 82 and a lower roller 88, so that the resultant pocket configuration as shown in FIG. 11 features diamond-shaped pockets 90 where the spiral cavities intersect, which pockets 90 extend outwards on both sides of the sheet material 92. It will be understood that pockets will also be formed elsewhere on sheet 92, but these other pockets, not shown, will appear only on alternative sides of the sheet material. The result of FIG. 11 could also be attained by the provision of a plurality of diamond-shaped cavities similar to cavities 28, or apertures, or pyramidal cavities as shown in FIG. 12, in which the pyramidal cavities 94 are each provided with an opening 96 for application of a vacuum effect to the setting and still soft deformable sheet material into the cavity 94 and thus form a pyramidal or diamond-shaped pocket 90.

FIGS. 13, 14 and 15 illustrate the provision of a plurality of discrete apertures or holes 98 in a completely hollow roller 100. As shown in FIG. 14, the apertures 98 may be generally circular, so that hemispherical or hemoval pockets are formed; and as shown in FIG. 15, the apertures 98 may be generally triangular so that accordingly shaped, e.g. generally pyramidal, pockets are formed. The apertures 98 may of course be of any suitable or desirable configuration, e.g. rectangular, elliptical, etc.

As mentioned above a problem encountered in the prior art processes is the thinning out of the molten tubular element in the areas which will form the center portion of the bilaminar sheet material. This problem has been overcome by another embodiment of the present invention in which a molten tubular member is extruded such that its wall sections are initially thicker in the area which will form the center portion of the bilaminar sheet, than are the wall sections which will form the edge portions of the sheet. It has been found that as the temperature of the extruded molten material is increased, as it exits the nozzle, the wall thickness of the tubular member formed also increases. This is due to the fact that the flowability of the molten material increases as the temperature increases, thereby allowing a greater amount of material to be extruded through portions of the annular slot having the greater temperature. Therefore, by varying the temperature of the extruded material around the annular slot as it is extruded, it is possible to control the thickness of the side walls of the various sections of the tube member. This is accomplished by a plurality of heater elements positioned around the circumference of the extruder nozzle so that the temperature at various points around the circumference of the nozzle may be controlled.

Referring to FIG. 16, where the above embodiment is shown, extruder nozzle 12 is provided with heating elements 110, 111, 112 and 113. Note that the heat elements 110, 111, 112 and 113 depicted in FIG. 16 are not shown in the elevation view of FIG. 2. These heating elements are positioned around the circumference of the outer sleeve 114 such that the material being extruded through annular circular slot 115 is heated as it exits from said slot. The heating elements 110, 111, 112 and 113 may be of any conventional design, as for example electrical resistor type heaters and may be controlled by any suitable means. Furthermore, they can be so arranged that the temperature of the elements may be varied jointly, in pairs or individually.

In order to provide for a uniform sheet thickness, it is necessary to heat those portions of the extruded tube which will form the center portion of the sheet to a greater extent than those portions of the tube which will form the edge portions of the sheet. Referring again to FIG. 16 heater element 110 and 111 are set at a higher temperature than heater element 112 and 113 so that a greater amount of molten material will be extruded from the annular slot in the proximity of heaters 110 and 111. Due to this excess material, the side wall portions of the extruded tube member adjacent heater elements 110 and 111 will be initially thicker than the side wall portions adjacent heaters 112 and 113, as the tube member exits nozzle 12. As the molten tube enters the nip of the rollers some of the molten material in the thicker portions of the tube will flow toward the thinner portions of the tube, thereby producing a bilaminar sheet of uniform thickness when the collapsed tube exits the rollers.

It has been found that a circular annular slot having a diameter of about 10 to 15 inches and a slot opening of 0.020 will produce a bilaminar sheet of uniform thickness of about 1 to 2 mils. when the heater elements adjacent the tubular member portions, which will form the central portions of the sheet material are heated from about 300° to 340° F., preferably about 320° F. and the heater elements adjacent the tubular member portions, which will form the edge portions of the sheet material, are heated to about 270° F. to about 310° F., preferably about 290° F.

Although the extruder nozzle of the present invention is shown having four heater elements it is possible to have a greater or a lesser number, so long as it is possible to heat the sections which will form the central portion of the bilaminar sheet to a greater extent than those portions which will form the edge portion of the sheet.

It is understood that the foregoing description has been for the purpose of illustration and should not be construed as a limitation to the scope of the invention. Furthermore, variations and modifications may be made by those skilled in the art without departing from the overall concepts of the invention, and reference is made to the appended claims for a definition of the scope of the invention.

What is claimed is:

1. A method of making a bilaminar sheet material having uniform thickness which comprises:
   (a) extruding a molten thermoplastic material through an annular slotted extrusion means,
   (b) extruding the thermoplastic material through the annular slotted extrusion means such that said molten material forms a generally tubular hollow element having a plurality of linear side wall portions, each of said side wall portions having a constant thickness along its entire length, a number of said linear side wall portions having unequal thicknesses relative to other side wall portions,
   (c) discharging a gas at a slight positive pressure into said element as it is formed whereby said gas fills said element,
   (d) passing said tubular hollow element containing said gas between two juxtaposed parallel cylindrical rollers,
   (e) rotating said rollers in opposite directions so as to draw said tubular hollow element into the nip between the rollers, at least one of said rollers having a plurality of spaced apart recesses on its outer surface, whereby said tubular hollow element is collapsed and flattened into a continuous bilaminar planar sheet element with raised closed pockets containing said gas, the opposed flattened surfaces of said element being autogenously welded to each other in the areas of contact,
   (f) maintaining the temperature of the thermoplastic material around the annular slotted extrusion means by means of a plurality of heater elements positioned around and in close proximity to the annular slot, the plurality of heater elements comprising four heater elements, said four heater elements comprising a first pair of oppositely positioned heaters and a second pair of oppositely positioned heaters around said annular slot, the first pair of heater elements being substantially parallel to the horizontal axis of said juxtaposed parallel rollers and said second pair of heater elements being substantially perpendicular to said horizontal axis of said juxtaposed roller.

2. The method of claim 1 wherein said annular slot has a diameter of from about 8 to 15 inches and a slot opening of about 0.020 of an inch.

3. The method of claim 1 wherein the first pair of heating elements are heated to a temperature of about 320° F. and said second pair of heating elements are heated to a temperature of about 290° F.

4. The method of claim 1 wherein the first pair of heating elements are heated to a temperature of about 300° F. to about 340° F. and said second pair of heating elements are heated to a temperature of about 270° F. to 320° F., and said first pair of heating elements being maintained at a temperature of at least 10° F. higher than said second pair of heater elements.

5. The method of claim 4 in which the gas is air.

6. The method of claim 4 in which the recesses are hemispherical.

7. The method of claim 4 in which the recesses are pyramidal.

8. The method of claim 4 in which the roller is provided with a hollow central axial section, a passage extends from the hollow interior of the roller to each recess, and means is provided to create a vacuum within the hollow roller.

9. The method of claim 4 in which the roller is hollow and the spaced apart recesses are apertures in the roller.

10. The method of claim 4 in which the tubular hollow element is heated before passing between the two juxtaposed parallel cylindrical rollers.

11. The method of claim 4 in which spaced apart recesses are provided on both of the rollers, so that the raised closed pockets are formed on both sides of the bilaminar planar sheet element.

12. The method of claim 11 in which the spaced apart recesses on one roller mate with the spaced apart recesses on the other roller so that each pocket formed by mating recesses extends outwards on both sides of the continuous bilaminar planar sheet element.

13. The method of claim 4 in which the spaced apart recesses are a plurality of spiral grooves.

14. The method of claim 13 in which spiral grooves are provided on both of the rollers, and the grooves on one roller are of right-hand pitch and the grooves on the other roller are of left-hand pitch.

* * * * *

UNITED STATES PATENT AND TRADEMARK OFFICE
CERTIFICATE OF CORRECTION

PATENT NO. : 4,184,904
DATED : January 22, 1980
INVENTOR(S) : William Gaffney

It is certified that error appears in the above-identified patent and that said Letters Patent are hereby corrected as shown below:

Change the Assignee from "Charlotte Mintz, New York, N.Y."

to -- Charlotte Mintz, New York, N.Y., a part interest --.

Signed and Sealed this

Fifteenth Day of July 1980

[SEAL]

Attest:

SIDNEY A. DIAMOND

Attesting Officer

Commissioner of Patents and Trademarks